(12) United States Patent
Zeng et al.

(10) Patent No.: US 10,757,703 B2
(45) Date of Patent: Aug. 25, 2020

(54) LTE CLUSTER SYSTEM CO-CHANNEL GROUP NETWORK RESOURCE SCHEDULING METHOD AND DEVICE

(71) Applicant: HYTERA COMMUNICATIONS CORP., LTD., Shenzhen, Guangdong (CN)

(72) Inventors: Jiasheng Zeng, Shenzhen (CN); Qingli Zhang, Shenzhen (CN); Qingxiang Yu, Shenzhen (CN)

(73) Assignee: Hytera Communications Corporation Limited (CN)

( * ) Notice: Subject to any disclaimer, the term of this patent is extended or adjusted under 35 U.S.C. 154(b) by 218 days.

(21) Appl. No.: 15/744,592

(22) PCT Filed: Jul. 13, 2015

(86) PCT No.: PCT/CN2015/083856
§ 371 (c)(1),
(2) Date: Jun. 12, 2018

(87) PCT Pub. No.: WO2017/008221
PCT Pub. Date: Jan. 19, 2017

(65) Prior Publication Data
US 2018/0295621 A1    Oct. 11, 2018

(51) Int. Cl.
*H04W 4/00*    (2018.01)
*H04W 72/04*    (2009.01)
*H04W 72/00*    (2009.01)

(52) U.S. Cl.
CPC ..... *H04W 72/0453* (2013.01); *H04W 72/005* (2013.01)

(58) Field of Classification Search
CPC ...... H04W 72/04; H04W 88/08; H04W 76/00
See application file for complete search history.

(56) References Cited

U.S. PATENT DOCUMENTS 5,914,945 A * 6/1999 Abu-Amara ........ H04L 12/5602
370/329
8,068,875 B2 * 11/2011 Nagai ................. H04W 72/082
370/200
(Continued)

FOREIGN PATENT DOCUMENTS

CN    1879781 A    12/2006
CN    103052079 A    4/2013
(Continued)

OTHER PUBLICATIONS

First Office Action for Chinese Patent Application No. 201580001284.9 dated Jan. 28, 2019.
(Continued)

Primary Examiner — Siren Wei
(74) Attorney, Agent, or Firm — Calfee, Halter & Griswold LLP

(57) ABSTRACT

The embodiments of the present application provide a resource scheduling method for same frequency networking in an LTE cluster system and a device thereof. The method includes: determining a first frequency domain resource in the LTE cluster system, wherein the first frequency domain resource is an accessible frequency domain resource available for group services and belongs to a frequency domain resource of the cluster system; dividing the first frequency domain resource into at least two frequency domain resource groups; and selecting one frequency domain resource group from the at least two frequency domain resource groups to perform group services when a newly-built group service exists, so as to implement same frequency networking resource scheduling. The embodiments of the present application can reduce or eliminate the same frequency interference in the group services.

20 Claims, 5 Drawing Sheets

(56) References Cited

U.S. PATENT DOCUMENTS

| | | | | |
|---|---|---|---|---|
| 2009/0219944 A1* | 9/2009 | Liang | ............... | H04W 16/14 370/431 |
| 2010/0309866 A1* | 12/2010 | Katayama | ............... | H04L 5/003 370/329 |
| 2011/0149875 A1* | 6/2011 | Ahuja | ............... | H04L 47/72 370/329 |
| 2012/0071188 A1* | 3/2012 | Wang | ............... | H04W 16/14 455/509 |
| 2012/0243486 A1* | 9/2012 | Zeira | ............... | H04W 72/005 370/329 |
| 2013/0308571 A1* | 11/2013 | Tao | ............... | H04W 16/02 370/329 |
| 2014/0086049 A1* | 3/2014 | Suonvieri | ............... | H04W 28/22 370/230 |
| 2015/0092650 A1 | 4/2015 | Mehrotra et al. | | |

FOREIGN PATENT DOCUMENTS

| | | | |
|---|---|---|---|
| CN | 103096262 | A | 5/2013 |
| CN | 103118334 | A | 5/2013 |
| CN | 103220625 | A | 7/2013 |
| CN | 104581649 | A | 4/2015 |

OTHER PUBLICATIONS

Search Report and Written Opinion for International Application No. PCT/CN2015/083856 dated Mar. 25, 2016.

English Translation of International Search Report From PCT/CN2015/083856 dated Mar. 25, 2016 (2 pages).

* cited by examiner

LTE CLUSTER SYSTEM CO-CHANNEL GROUP NETWORK RESOURCE SCHEDULING METHOD AND DEVICE

TECHNICAL FIELD

The embodiments of the present invention relate to the field of wireless communication technologies, and in particular, to a resource scheduling method for same frequency networking in an LTE cluster system and a device thereof.

BACKGROUND

This part is intended to provide background or contexts for the embodiments of the present invention stated in the claims. The descriptions here shall not be deemed as the prior art because of being included in this part.

Since an LTE system needs to occupy a larger bandwidth resource, to increase the utilization of frequency band resources, a mode of same frequency networking is usually used instead of inter-frequency networking during the practical application process. However, an accompanying problem of the LTE system using the same frequency networking is the existence of the same frequency interference. Especially between adjacent cells, since the same frequency band resource is used, when mobile terminals of different cells are communicating with an EnodeB in the same time period, the EnodeB or the mobile terminals cannot correctly receive signals.

In order to reduce or eliminate the same frequency interference in the LTE system under the same frequency networking, there have appeared an ICIC (Inter-Cell Interference Coordination, inter-cell interference coordination) technology and a CoMP (Coordinated Multiple Points, coordinated multiple points) technology. The ICIC technology reduces the inter-cell same frequency interference through a manner of being combined with a scheduling technology and power control, etc. The technology limits the distribution of time-frequency resources and power resources of a cell center user (CCU: Cell Center User) and a cell edge user (CEU: Cell Edge User), which increases the throughput rate of the cell edge user, and enhances the covering capability of the system. The CoMP technology improves the signal receiving and transmitting of the EnodeB and the terminal by means of cooperative transmitting and receiving of antennas at multiple cell sites, which reduces the inter-cell same frequency interference, and increases the throughput rate of the cell edge user and the average throughput rate of the cell.

However, there are a large number of group services in the LTE cluster system that deliver data in a broadcast-like form. As for the ICIC technology, since the broadcast manner cannot distinguish the cell center user and the cell edge user through a power or carrier wave manner, so that the resource distribution of the center user and the cell edge user cannot be limited respectively, therefore the ICIC technology cannot be applied. As for the CoMP technology, since the technology requires the user to transmit back specific feedback information in downlink transmission to help the EnodeB adjust the parameter setting of a transmitting end, but the broadcast manner usually does not transmit the feedback information, therefore the CoMP technology cannot be applied either. Thus, in the LTE cluster system, the same frequency interference in the group services cannot be eliminated through the prior art.

SUMMARY

In order to solve the foregoing problems, the embodiments of the present application provide a resource scheduling method for same frequency networking in an LTE cluster system and a device thereof, so as to reduce or eliminate the same frequency interference problems in the group services in the LTE cluster system.

In one aspect, a resource scheduling method for same frequency networking in an LTE cluster system provided by the embodiments of the present application comprises:

determining a first frequency domain resource in the LTE cluster system, wherein the first frequency domain resource is an accessible frequency domain resource to a group service and belongs to a frequency domain resource of the cluster system;

dividing the first frequency domain resource into at least two frequency domain resource groups; and selecting one frequency domain resource group from the at least two frequency domain resource groups to perform the group service when a newly-built group service exists, so as to implement same frequency networking resource scheduling.

Preferably, the dividing the first frequency domain resource into at least two frequency domain resource groups specifically comprises:

dividing the first frequency domain resource into frequency domain resource groups with a number adaptive to the quantity of the group service according to the quantity of the group service, and dividing the first frequency domain resource into frequency domain resource groups with a size adaptive to a service type according to the service type.

Preferably, when a newly-built group service exists, one frequency domain resource group is selected from the at least two frequency domain resource groups to perform the group service, so as to implement same frequency networking resource scheduling comprises:

When the newly-built group service exists, judging whether there exist unoccupied frequency domain resource groups, and if the unoccupied frequency domain resource groups exist, one frequency domain resource group is selected from the unoccupied frequency domain resource groups to perform the group service, so as to implement same frequency networking resource scheduling.

Preferably, if all the frequency domain resource groups are occupied, the frequency domain resource group with minimum interference is selected to perform the group service.

Further preferably, the selecting the frequency domain resource group with minimum interference to perform the group service specifically comprises:

acquiring a transmission power of the frequency domain resource group occupied; and selecting the frequency domain resource group with a transmission power lower than a preset threshold to perform the group service.

Preferably, the method further comprises: determining a second frequency domain resource in the LTE cluster system, wherein the second frequency domain resource is an accessible frequency band resource to a single call service and belongs to a frequency domain resource of the cluster system excluding the first frequency domain resource;

dividing the second frequency domain resource into at least two continuous frequency domain regions; and selecting one continuous frequency domain region from the at least two continuous frequency domain regions as a primary frequency region to perform the single call service when a newly-built single call service exists.

Preferably, the single call service is the newly-built single call service existing at a cell edge, and then the primary frequency region selected to perform the single call service is different from a primary frequency region selected by another single call service existing at a cell edge adjacent to the cell.

Preferably, the single call service is a newly-built single call service existing at a cell center, then one continuous frequency domain region is selected from the at least two continuous frequency domain regions as the primary frequency region to perform the single call service, and at least one continuous frequency domain region excluding the primary frequency region is selected from the at least two continuous frequency domain regions as a secondary frequency region to perform the single call service, and the power transmission in the secondary frequency region is reduced.

Preferably, when the single call services in the LTE cluster system are more than the group services, then the second frequency domain resources in the LTE cluster system determined are more than the first frequency domain resources; and when the group services in the LTE cluster system are more than the single call services, then the first frequency domain resources in the LTE cluster system determined are more than the second frequency domain resources.

In another aspect, the embodiments of the present application also provide a resource scheduling device for same frequency networking in an LTE cluster system. The device comprises: a first determination unit, a first resource group dividing unit, and a first resource scheduling unit, wherein:

the first determination unit is configured to determine a first frequency domain resource in the LTE cluster system, wherein the first frequency domain resource is an accessible frequency domain resource available to a group service and belongs to a frequency domain resource of the cluster system;

the first resource group dividing unit is configured to divide the first frequency domain resource into at least two frequency domain resource groups; and the first resource scheduling unit is configured to select one frequency domain resource group from the at least two frequency domain resource groups to perform the group service, so as to implement same frequency networking resource scheduling when a newly-built group service exists.

Preferably, the first resource group dividing unit comprises a resource group number dividing subunit and a resource group size dividing subunit, wherein:

the resource group number dividing subunit is configured to divide the first frequency domain resource into frequency domain resource groups with a number adaptive to the quantity of the group service according to the quantity of the group service, and the resource group size dividing subunit is configured to divide the first frequency domain resource into frequency domain resource groups with a size adaptive to a service type according to the service type.

Preferably, the first resource scheduling unit comprises a judgment subunit and a first scheduling subunit, wherein:

the judgment subunit is configured to, when there exist the newly-built group service, judge whether there exist unoccupied frequency domain resource groups, and if the unoccupied frequency domain resource groups exist, trigger the first scheduling subunit; and the first scheduling subunit is configured to select one frequency domain resource group from the unoccupied frequency domain resource groups to perform the group service, so as to implement same frequency networking resource scheduling.

Preferably, the first resource scheduling unit comprises a second scheduling subunit configured to select the frequency domain resource group with minimum interference to perform the group service when all the frequency domain resource groups are occupied.

Preferably, the second scheduling subunit comprises a power acquisition subunit and a resource group selection subunit, wherein:

the power acquisition subunit is configured to acquire a transmission power of the frequency domain resource group occupied; and the resources group selection subunit is configured to select the frequency domain resource group with a transmission power lower than a preset threshold to perform the group service.

Preferably, the device further comprises a second determination unit, a second resource group dividing unit and a second resource scheduling unit, wherein:

the second determination unit is configured to determine a second frequency domain resource in the LTE cluster system, wherein the second frequency domain resource is an accessible frequency band resource to a single call service and belongs to a frequency domain resource of the cluster system excluding the first frequency domain resource;

the second resource group dividing unit is configured to divide the second frequency domain resource into at least two continuous frequency domain regions; and the second resource scheduling unit is configured to select one continuous frequency domain region from the at least two continuous frequency domain regions as a primary frequency region to perform the single call service when a newly-built single call service exists.

The embodiments of the present application also provide an EnodeB, wherein the EnodeB comprises a processor, and the processor is configured to determine a first frequency domain resource in an LTE cluster system, wherein the first frequency domain resource is an accessible frequency domain resource to a group service and belongs to a frequency domain resource of the cluster system; divide the first frequency domain resource into at least two frequency domain resource groups; and select one frequency domain resource group from the at least two frequency domain resource groups to perform the group service when a newly-built group service exists, so as to implement same frequency networking resource scheduling.

According to the embodiments of the present application, the frequency domain resource available for the group service from the frequency domain resources of the LTE cluster system is determined, and then the frequency domain resource is grouped, and one frequency domain resource group is selected to perform the group service when the newly-built group service arrives. Compared with the prior art, in one aspect, the embodiments of the present application separate the frequency domain resources accessed by the group service from the frequency domain resources accessed by other services (i.e., the first frequency domain resource and the non-first frequency domain resource), so that the group service can be scheduled on a appropriative frequency domain resource, thus avoiding same frequency interference between the group service and other services. In another aspect, the frequency domain resources available for the group service are grouped in the embodiments of the present application, and one of the frequency domain resource groups can be selected by different group services to implement the service. Since the frequency domain resources of different frequency domain resource groups are different, the same frequency interference among multiple group services is avoided. Moreover, the frequency domain resources available for the single call service from the frequency domain resources of the LTE cluster system is determined, so that the single call service and the group service are respectively scheduled on different frequency domain resources, thus avoiding same frequency interference between the single call service and the group service.

BRIEF DESCRIPTION OF THE DRAWINGS

The above and other objects, features and advantages of the exemplary embodiments of the invention will become more apparent by reading the following detailed descriptions with reference to the drawings. In the drawings, several embodiments of the invention are shown by way of illustration rather than limitation, wherein.

DETAILED DESCRIPTION

The principle and spirit of the invention will be described hereinafter with reference to several exemplary embodiments. It should be understood that these embodiments are merely given to enable those skilled in the art to better understand so as to implement the invention, rather than to limit the scope of the invention by any manner. To the contrary, these embodiments are provided so that this disclosure will be thorough and complete, and will fully convey the scope of the disclosure to those skilled in the art.

Figure 1:
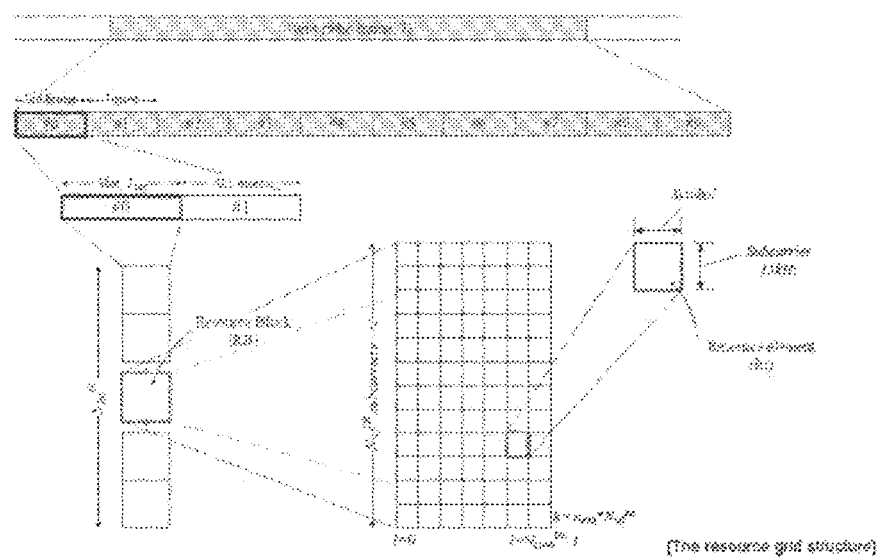
FIG. 1 is a structural schematic diagram of a physical layer resource in an LTE system.

In order to understand the technical solutions of the present application easily, a physical layer resource in an LTE system is briefly introduced hereinafter with reference to FIG. 1. The frame size of one wireless frame in the LTE system is 10 ms, one wireless frame may comprise 10 subframes from No. 1 to No. 9, the frame size of each subframe is 1 ms, the subframe may also be divided into a time slot, and resources for resource scheduling are in the time slot. A certain block in one time slot of FIG. 1 is called a resource block, and signal carry can be implemented through resource carrying, so as to implement various different services.

Figure 2:
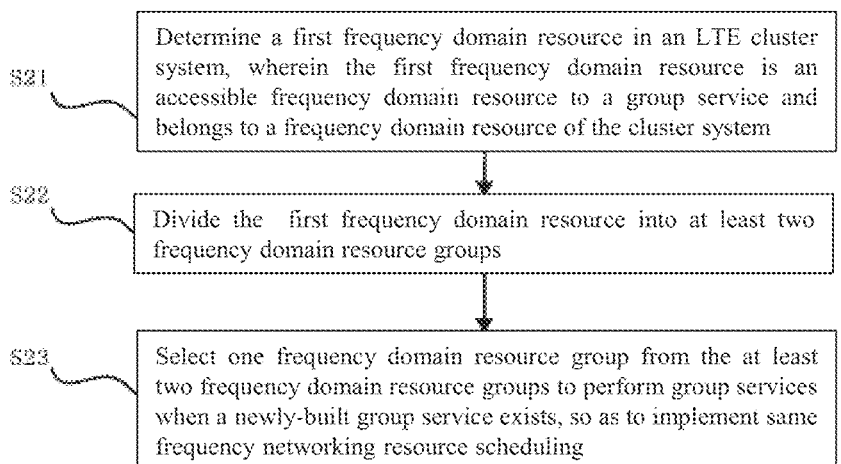
FIG. 2 is a flow chart of an embodiment of a resource scheduling method for same frequency networking in an LTE cluster system.

Referring to FIG. 2, FIG. 2 shows an embodiment of a resource scheduling method for same frequency networking in an LTE cluster system according to the present application. The method is applied to an EnodeB side, and the embodiment comprises the following steps.

In step S21, a first frequency domain resource in the LTE cluster system is determined, wherein the first frequency domain resource is an accessible frequency domain resource to a group service and belongs to a frequency domain resource of the cluster system.

The frequency domain resources of the LTE cluster system are configured to implement various services of the LTE system, and different services may use the same or different frequency domain resources. According to the embodiment of the present application, a certain part of frequency domain resources may be determined as resources available for the group service from the frequency domain resources of the LTE cluster system in order to conduct the group service. Of course, under some circumstances, all the frequency domain resources of the LTE cluster system may also be determined as the resources available for the group service. It should be noted that, in either case, the first frequency domain resource determined always "belongs to" the frequency domain resources of the LTE cluster system, that is to say, the term "belongs to" may be understood in a broader sense here, i.e., it may not only include the "belongs to" in the case that the first frequency domain resource equals the frequency domain resource of the LTE cluster system, but also include the "belongs to" in the case that the first frequency domain resource is a part of frequency domain resources of the LTE cluster system. In the case that the first frequency domain resource determined is only a part of frequency domain resources of the LTE cluster system, the remaining frequency domain resources may be used for performing other services according to the actual requirements, for example, a single call service to be mentioned later.

In step S22, the first frequency domain resource is divided into at least two frequency domain resource groups.

Figure 3:
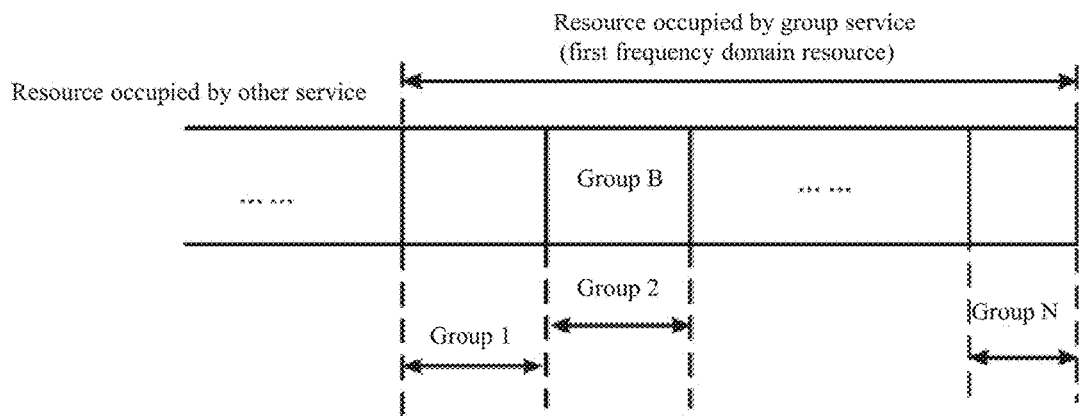
FIG. 3 is a schematic diagram of dividing a first frequency domain resource into multiple frequency domain resource groups.

After the first frequency domain resource is determined, the first frequency domain resource may also be grouped and divided into multiple frequency domain resource groups. As shown in FIG. 3, the first frequency domain resource in the figure is divided into N groups. During a specific division, there are no specific restrictions in the embodiment of the present application for how many frequency domain resource groups (i.e., the quantity of the frequency domain resource groups) to be divided, and how wide the frequency domain resource (i.e., the size of the frequency domain resource group) occupied by each frequency domain resource group. Of course, during the actual application process, some optimal "division" measures may be adopted in view of various realities. For example, the issue of the quantity of the frequency domain resource groups to be divided may be determined according to the quantity of the group service. It is mainly considered in this practice that the quantity of the group service of a cluster in a certain region of a private network is not large in general. Therefore, the quantity of the frequency domain resource group determined may be equal to the quantity of the group service or multiplied to the quantity of the group service. In all, the quantity of the frequency domain resource group determined shall be capable of adapting to the quantity requirements on the group service. For another example, the size of each frequency domain resource group divided may be determined according to the service type. For example, for a small data volume service such as a voice service, each frequency domain resource group may be smaller, for a mass data service such as a video service, each frequency domain resource group may be larger; of course, some frequency domain resource groups in the same first frequency domain resource can be divided to be larger according to different service types, to adapt to a larger number of services, while other frequency domain resource groups may be divided to be smaller, to adapt to a smaller number of services. In all, the size of the frequency domain resource group determined should be capable of adapting to the changes of the service types.

In step S23, when a newly-built group service exists, one frequency domain resource group is selected from the at least two frequency domain resource groups to perform the group service, so as to implement same frequency networking resource scheduling.

The newly-built group service may be a group service newly built in the current cell or a group service transferred from other cells, which is not specifically limited in the present invention.

It can be seen from the above descriptions to the technical solutions that, compared with the prior art, the embodiments of the present application can overcome the forgoing defects in the prior art, and achieve outstanding technical effects, the details of which are as follows.

On one hand, in the prior art, those skilled in the art generally use the frequency domain resources in the LTE cluster system in an integrated manner. Even if the same frequency interference problem occurs, the main consideration in solving the problem is still how to eliminate the same frequency interference regarding the entire frequency domain resources, resulting in the generation of the ICIC technology and the CoMP technology. For the single call service, the ICIC technology and the CoMP technology can be utilized to overcome the same frequency interference problem. However, these technologies seem "powerless" in the group service, i.e., the functions of conducting the group service and eliminating the same frequency interference cannot be balanced, and people are still trying to find a method to completely solve the same frequency interference problem. In the above embodiment of the present application, however, the inventor switches ideas and overcomes prejudices to determine the frequency domain resources exclusively for the group services from the frequency domain resources of the cluster system (i.e., dividing the resources of the LTE cluster system into the first frequency domain resource and the non-first frequency domain resource [the non-first frequency domain resource may not exist according to the actual situation]), so that the frequency domain resources used by the group services and the frequency domain resources used by other services (for example, the single call service) are clearly distinguished. The scheduling of the group services and the scheduling of other services are separately performed on the frequency domain segments, so as to better avoid or improve the same frequency interference between the group services and other services, make overall consideration of the implementation of the group services and the improvement of the same frequency interference, and eliminate the two tasks. What is also worth mentioning here is the single frequency network technology for group services existing in the prior art, which transmits the same data for the cells in a single frequency network at the same time and in the same frequency domain, so as to achieve reliable coverage of a certain service area. However, when the single call service exists in the meanwhile, and signal call users in the coverage area of the single frequency network also transmit the same data at the same time and in the same frequency domain, the system capacity will be severely reduced. That is to say, the same frequency interference problem still exists in this case. The frequency domain resources excluding the first frequency domain resource can be used to implement the single call service in the above embodiment of the present application; in this way, the performing process of the single call service will not affect the group services, and the same frequency interference problem will not exist either.

In another aspect, the frequency domain resources available for the group service are grouped in the embodiment of the present application, thus being capable of ensuring that one of different group services may be selected to implement the service. Since the frequency domain resources of different frequency domain resource groups are different, the same frequency interference among multiple group services is avoided. Of course, this way of dividing the resource groups for the frequency domain resources can also preferably meet the "competition" demands of multiple group services on the frequency domain resources.

During the practical application process, there may be some special situations that is worth explaining for the foregoing technical solutions.

The first is the timing problem of several steps in the technical solutions of the present application. Take step S22 in the above embodiment for example. The existence of the timing sequence relationship among the "previous" step S21 and "subsequent" step S23 seems to show that the technical solution of the present application has been solidified into the specific executing sequence, but it should be emphasized that the step S22 can be shown as other sequence in the entire technical solution. For example, one situation is that the timing sequence of step S22 may be shown differently in different service executing states: if the technical solution of the present application is executed for the first time, i.e., the service executing state is to start executing. Under this situation, it is necessary to perform step S22 and step S21 before a first newly-build group service arrives, so as to prepare for the group service to select the frequency domain resources. In this way, the timing sequence relationship among the several steps including step S22 can be shown as the timing sequence of the above embodiment. However, when the service executing state is performed to the second time or above, since step S22 and step S21 have been performed in the previous service executing process, it is only necessary to select one resource group from the prepared frequency domain resource groups to perform the group service without repeating the execution of the previous two steps; in this way, the close relationship between step S22 and other steps is broken. For another example, another situation is that the timing sequence of step S22 may be related to the implementation manner of an implementer: The implementer may determine the first frequency domain resource firstly and then divide the multiple frequency domain resource groups for the first frequency domain resource as in the foregoing embodiment. The implementer may also perform frequency domain grouping on the frequency domain resources of the LTE cluster system firstly, and then select one or more frequency domain resource groups as the first frequency domain resources available for the group services. In the latter implementation manner, the timing sequence relationship between step S22 and step S21 is just opposite to that in the foregoing embodiment. In conclusion, the timing sequence relationship of several steps in the technical solution of the present application should be understood from the practical application as well as the technical implementation itself.

Secondly, in step S23 of the above embodiment, when a newly-built group service exists, one frequency domain resource can be selected from multiple frequency domain resource groups to perform the group service. How to select and which frequency domain resource group to select for performing the current group service is not especially defined here. That is to say, from the perspective of solving the technical problem of the present application, any one of the ways in which the objectives of the present invention can be achieved may be taken to implement the selection of the frequency domain resource groups. However, during the practical application process, various factors need to be considered to satisfy specific demands in various scenarios. Several consideration factors are illustrated in the following examples.

The first is to select the level of complexity of the process. Obviously, in the actual application process, a more convenient way is random selection or polling selection, that is, the random mode or the polling mode may be adopted to select the frequency domain resource group available for the current group services from multiple frequency domain resource groups, which does not require too much targeted design of the selection process, thus saving the "selection" of resources. However, the shortcoming of this mode is that the situations of the group services themselves are not being considered, but only a "tough" uniform selection mode is adopted, which may cause that some group services are mutually affected or specific group services cannot be satisfied preferably.

The second is whether there is any impact on other services in the adjacent frequency domain resource groups. In the LTE cluster system, different transmission powers may be used in different group services in the same cell set to broadcast and transmit; if the transmission power in a certain frequency domain resource group is higher, then other services carried on the frequency domain resource groups adjacent to the frequency domain resource group may be interfered. For this reason, when selecting the frequency domain resource groups, one of the unoccupied frequency resource group or the frequency domain resource groups far away from the high transmission power may be prioritized.

The third is the impact degree on other services in the adjacent frequency domain resource groups. In the foregoing second consideration factor, if all the existing frequency domain resource groups are already occupied, then the frequency domain resource groups that have less interference to the services in other frequency domain resource groups may be selected. There are many ways to determine the minimum interference, for example, the degree of interference can be determined in an orthogonal manner. Usually, when the service symbols carried by the frequency domains in the two frequency domain resources are orthogonal to each other, there will be no interference or the interference will occur to a relatively small extent. The following manner may also be adopted in the present application: the transmission power of the occupied frequency domain resource group is acquired firstly, and then the frequency domain resource group with a transmission power lower than a preset threshold is selected to perform the group service. When judging whether the transmission power is lower than the preset threshold, several frequency domain resource groups that are ordered in the top can be sorted as the candidate frequency domain resource groups according to the power levels.

Figure 4:
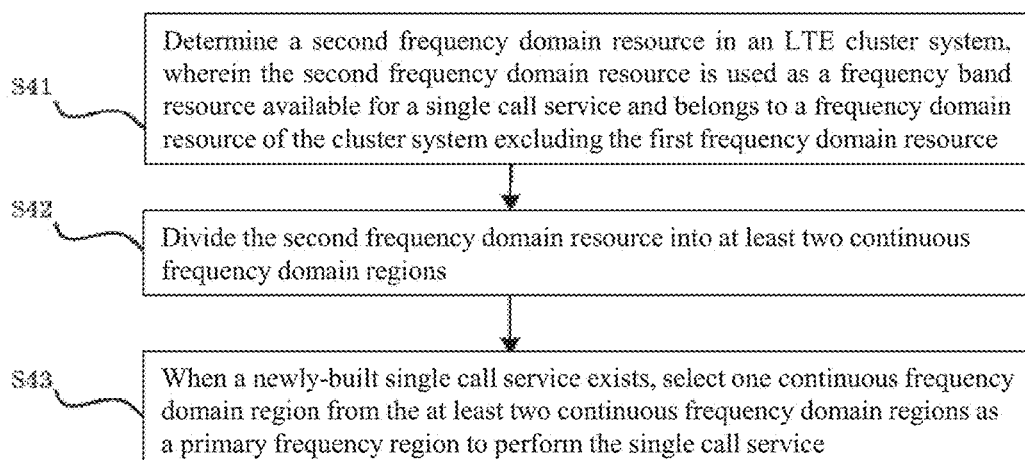
FIG. 4 is a flow chart of an embodiment implementing a single call service when performing group services.

The foregoing contents describe the embodiments of the present application in the context of group services in detail. In fact, the technical solution of the present application also has compatibility with services such as a single call, so that the single call service can also be implemented during the process of implementing the group services. As previously mentioned, when determining the first frequency domain resource available for the group services from the LTE cluster system, the frequency domain resources excluding the first frequency domain resource (the frequency domain resource does not occupy the entire frequency domain resources of the LTE cluster system at this moment) can also be accessed for other services, for example, the single call service. In this way, the LTE cluster system can implement both the group services and the single call service at the same time, and the two services use their own frequency ranges respectively, thus avoiding the same frequency interference problem between the group services and the single call service. Referring to FIG. 4, FIG. 4 shows a flow chart of one embodiment for implementing the single call service when performing the group services. The embodiment comprises the following steps (note: the part of the single call service is mainly presented hereinafter to avoid repeating).

In step S41, a second frequency domain resource in the LTE cluster system is determined, wherein the second frequency domain resource is an accessible frequency band resource to a single call service and belongs to a frequency domain resource of the cluster system excluding the first frequency domain resource.

In step S42, the second frequency domain resource is divided into at least two continuous frequency domain regions.

In step S43, one continuous frequency domain region is selected from the at least two continuous frequency domain regions as a primary frequency region to perform the single call service when a newly-built single call service exists.

In the process of resource scheduling for the single-call service described above, the second frequency domain resource is divided into multiple (at least two) continuous frequency domain regions, and one continuous region is selected from the continuous frequency domain regions as the primary frequency region and then the single call service is performed on the primary frequency region. Although the primary frequency region may still be randomly selected or selected in a polling manner, there may be different selection strategies considering the location of the single call service in the cell during the practical application process. Two typical situations are discussed below.

Figure 5A:
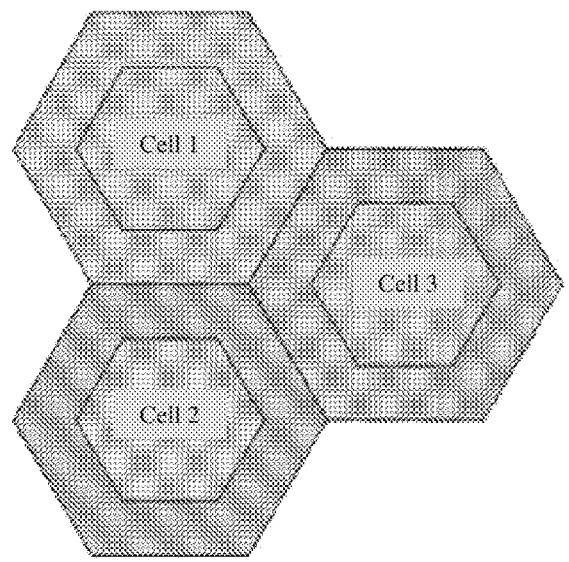
FIG. 5(a) is a schematic diagram of a composite structure of multiple cells.
Figure 5B:
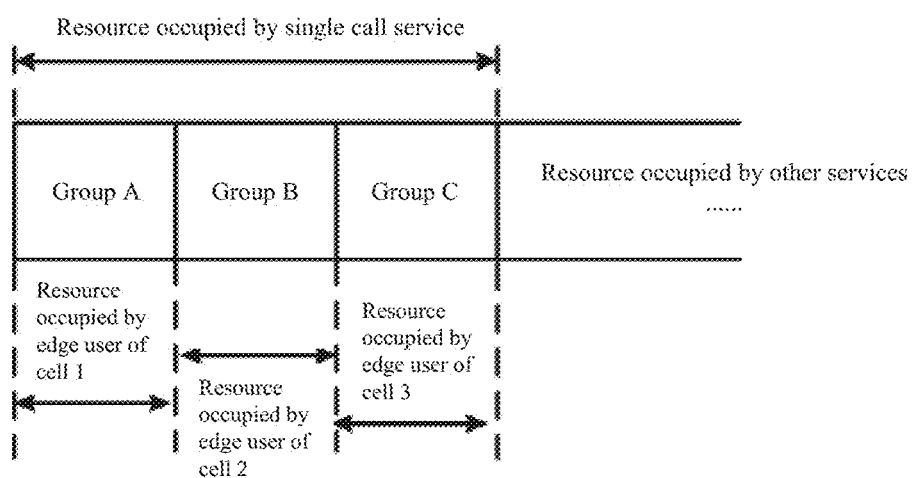
FIG. 5(b) is a schematic diagram of distributing a primary frequency region of the cell structure shown in FIG. 5(a)

The first is that the current single call service is located at a cell edge. In this case, the principal problem to be considered is whether the performing of the current single call service will have impact on an edge user of a cell adjacent to the cell for performing a single call service, i.e., whether the same frequency interference will occur. In order to avoid the edge user in one cell while performing the single call service from affecting the edge user in another adjacent cell while performing the single call service, there should be limitation in selecting the primary frequency region, which may be embodied as that the edge users of the two adjacent cells select different continuous regions respectively as the primary frequency regions. Because the primary frequency regions of the two cells are different, sending the same data at the same time does not cause interference. Take a cell structure shown in FIG. 5(a) for example. There are three adjacent cells (cell 1 to cell 3) in this figure. Assuming that the current second frequency domain resource is divided into three continuous frequency domain regions A, B and C, then referring to FIG. 5(b), for the cell 1, the edge user thereof can select a frequency domain section A as the primary frequency region to perform the single call service; for the cell 2, the edge user thereof may select the frequency domain section B as the primary frequency region to perform single call service; for the cell 3, the edge user thereof may select the frequency domain section C as the primary frequency region to perform single call service; because the edge users of the three cells respectively select different frequency domain sections as the primary frequency region and are respectively independent when performing the single call service, the same frequency interference will not occur.

Figure 6:
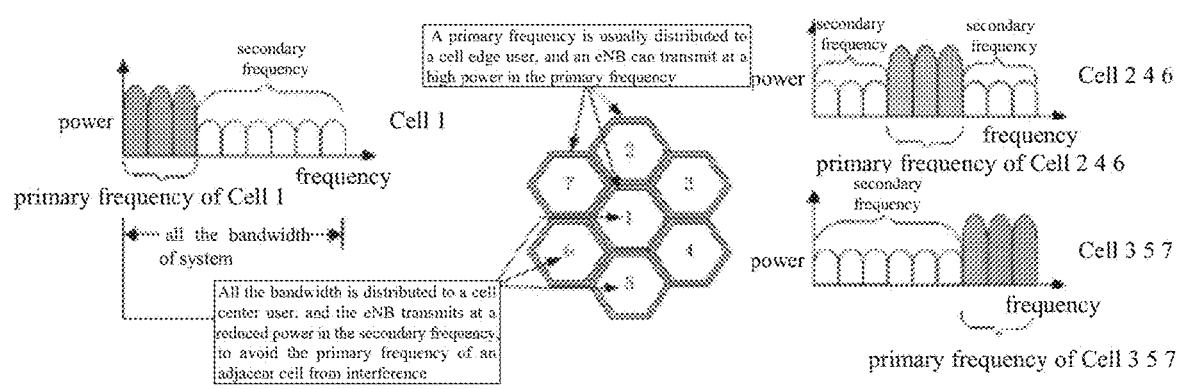
FIG. 6 is a schematic diagram of distributing a primary frequency region and a secondary frequency region.

The second is that the current single call service is located in a cell center. In this case, since the probability of the same frequency interference is reduced, the primary consideration is how to efficiently perform the single call service. Therefore, any section of the multiple continuous frequency domain region may be selected as the primary frequency region according to the actual needs. In other words, the entire second frequency domain resource can be accessed by the center user. In addition, in the case of selecting a certain continuous frequency domain region as the primary frequency region, some continuous frequency domain region other than the primary frequency region may also be selected as the secondary frequency region, and the power transmission may be reduced in the secondary frequency region. In this way, the need of the center user on the single call service can be satisfied on one hand, and the interference on other users for performing the single call service is also avoided on the other hand. FIG. 6 shows a schematic diagram of the primary frequency region and the secondary frequency region in which the second frequency region resource is divided into three continuous region sections, so that different primary frequency regions may be selected according to the situation of the cell, and the other two continuous region sections are used as the secondary frequency regions. The division and combined use manners of the primary frequency and secondary frequency regions are especially applicable to the first situation described above, that is, the situation in which the single call service is located in the edge region of the cell. In FIG. 6, the cell 1 selects the section A as the primary frequency region and selects the two sections B and C as the secondary frequency regions, the cells 2, 4 and 6 select the section B as the primary frequency region and selects the two sections A and C as the secondary frequency regions, and the cells 3, 5 and 7 select the section C as the primary frequency region and selects the remaining two sections as the secondary frequency regions.

Figure 7:
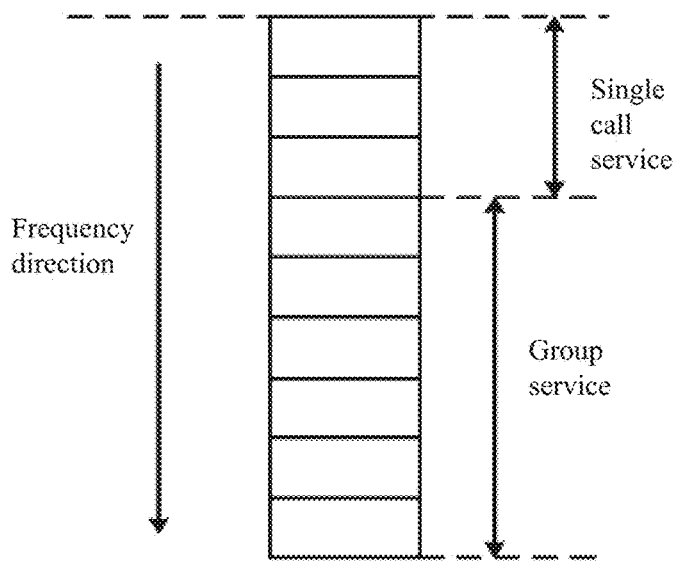
FIG. 7 is a schematic diagram of dividing resources of group services and a single call service.

The foregoing content generally describes the technical solutions of the present application in two aspects including the group services and the single call service in details, and mentions the determination of the first frequency region resource and the second frequency region resource in the LTE cluster system. To understand from the view of solving the technical problems of the present application, the proportion of these two resources in the LTE cluster system is irrelevant. But in the actual application process, it is necessary to consider the current situation to make a division of different proportions. The basic practice is to determine the respective proportions according to the service quantity of the group services and the single call services. That is, when the single call services in the LTE system are more than the group services, then the second frequency domain resources determined in the LTE system are more than the first frequency domain resources; when the group services in the LTE cluster system are more than the single call services, then the first frequency domain resources determined are more than the second frequency domain resources. In the resource dividing of the group services and the single call services shown in FIG. 7, three units of the frequency domain resources are used by the single call service, and six units of the frequency domain resources are used by the group services, which usually indicates that the current the LTE group system has more group services than the single call services, and there is a double proportional relation between the group services and the single call services.

Figure 8:
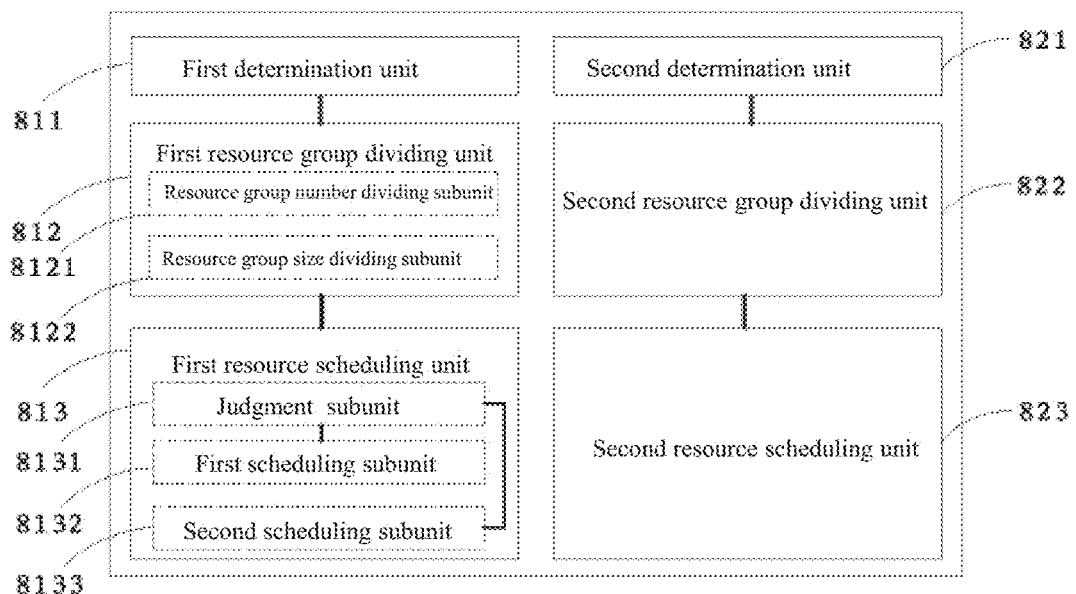
FIG. 8 is a structure block diagram of an embodiment of a resource scheduling device for same frequency networking in an LTE cluster system.

The foregoing contents describe various embodiments of the resource scheduling method for same frequency networking in an LTE cluster system of the present application in details. The method may be applied to cells that are geographically adjacent to each other. This is because that the probability of same frequency interference in these cells is greater, and the problem can be preferably overcome by using the technical solutions of the present application. Of course, this does not deny that the technical solutions of the present application (including the device embodiment mentioned below) can be applied to other scenarios. In addition, corresponding to the method embodiments, the present application further provides an embodiment of a resource scheduling method for same frequency networking in an LTE cluster system. Referring to FIG. 8, FIG. 8 shows an embodiment of the resource scheduling device for same frequency networking in an LTE cluster system. The embodiment comprises: a first determination unit 811, a first resource group dividing unit 812, and a first resource scheduling unit 813, wherein:

the first determination unit 811 is configured to determine a first frequency domain resource in the LTE cluster system, wherein the first frequency domain resource is an accessible frequency domain resource to a group service and belongs to a frequency domain resource of the cluster system;

the first resource group dividing unit 812 is configured to divide the first frequency domain resource into at least two frequency domain resource groups; and the first resource scheduling unit 813 is configured to, select one frequency domain resource group from the at least two frequency domain resource groups to perform the group service when a newly-built group service exists, so as to implement same frequency networking resource scheduling.

The working process of the above device embodiment is as follows: the first determination unit 811 determines the first frequency domain resource in the LTE cluster system, then the first resource group dividing unit 812 divides the first frequency domain resource into at least two frequency domain resource groups, and the first resource scheduling unit 813 selects one frequency domain resource group to perform the group service when the newly-built group service exists, so as to implement same frequency networking resource scheduling. The device embodiment can obtain the same or similar technical effects as that of the above method embodiments, and will not be elaborated herein to avoid repeating.

Each functional unit in the above device embodiment may have different internal composite structures according to different function implementing manners. That is, the structure of each unit is adaptive to the functional implementing manner thereof. For example, the first resource group dividing unit 812 may comprise a resource group number dividing subunit 8121 and a resource group size dividing subunit 8122, wherein: the resource group number dividing subunit 8121 is configured to divide the first frequency domain resource into frequency domain resource groups with a number adaptive to the quantity of the group service according to the quantity of the group service, and the resource group size dividing subunit 8122 is configured to divide the first frequency domain resource into frequency domain resource groups with a size adaptive to a service type according to the service type. The frequency domain resource groups divided through this manner can satisfy the actual needs preferably.

For another example, the first resource scheduling unit 813 may comprise a judgment subunit 8131 and a first scheduling subunit 8132, wherein: the judgment subunit 8131 is configured to, when the newly-built group service exists, judge whether there exist unoccupied frequency domain resource groups, and if the unoccupied frequency domain resource groups exist, trigger the first scheduling subunit; and the first scheduling subunit 8132 is configured to select one frequency domain resource group from the unoccupied frequency domain resource groups to perform the group service, so as to implement same frequency networking resource scheduling. Moreover, the first resource scheduling unit may also comprise a second scheduling subunit 8133, which is configured to select the frequency domain resource group with minimum interference to perform the group service when all the frequency domain resource groups are occupied. In specific implementation, the second scheduling subunit may be further implemented by using the following manner: the second scheduling subunit comprises a power acquisition subunit and a resource group selection subunit, wherein: the power acquisition subunit is configured to acquire a transmission power of the frequency domain resource group occupied; and the resources group selection subunit is configured to select the frequency domain resource group with a transmission power lower than a preset threshold to perform the group service.

According to the composition of the foregoing device, each functional unit is mainly used for implementing the group service. In fact, the above device may also comprise multiple functional units that implement the single call service. For example, the above device may also comprise a second determination unit 821, a second resource group dividing unit 822 and a second resource scheduling unit 823, wherein: the second determination unit 821 is configured to determine a second frequency domain resource in the LTE cluster system, wherein the second frequency domain resource is an accessible frequency band resource to a single call service and belongs to a frequency domain resource of the cluster system excluding the first frequency domain resource; the second resource group dividing unit 822 is configured to divide the second frequency domain resource into at least two continuous frequency domain regions; and the second resource scheduling unit 823 is configured to, select one continuous frequency domain region from the at least two continuous frequency domain regions as a primary frequency region to perform the single call service when a newly-built single call service exists. When implementing the single call service, the second resource scheduling unit may have different executing manners with respect to different features of the single call service; supposing that the single call service is the newly-built single call service existing at a cell edge, then the primary frequency region selected to perform the single call service is different from a primary frequency region selected by another single call service existing at a cell edge adjacent to the cell. Supposing that the single call service is a newly-built single call service existing at a cell center, then one continuous frequency domain region is selected from the at least two continuous frequency domain regions as the primary frequency region to perform the single call service, and at least one continuous frequency domain region excluding the primary frequency region is selected from the at least two continuous frequency domain regions as a secondary frequency region to perform the single call service, and the power transmission in the secondary frequency region is reduced.

The first determining unit and the second determining unit exist in the foregoing device embodiment. Although the first determining unit and the second determining unit may independently determine the required frequency domain resources from the LTE cluster system without conflicts, it is necessary to coordinate the first determining unit and the second determining unit in general. To be specific, when the single call services in the LTE cluster system are more than the group services, then the second frequency domain resources in the LTE cluster system determined by the second determination unit are more than the first frequency domain resources determined by the first determination unit; and when the group services in the LTE cluster system are more than the single call services, then the first frequency domain resources in the LTE cluster system determined by the first determination unit are more than the second frequency domain resources determined by the second determination unit.

Corresponding to the method embodiments and the embodiment, the present application also provides an EnodeB embodiment. In the embodiment, the EnodeB comprises a processor, and the processor is configured to determine a first frequency domain resource in an LTE cluster system, wherein the first frequency domain resource is an accessible frequency domain resource to a group service and belongs to a frequency domain resource of the cluster system; divide the first frequency domain resource into at least two frequency domain resource groups; and select one frequency domain resource group from the at least two frequency domain resource groups to perform the group service when a newly-built group service exists, so as to implement same frequency networking resource scheduling.

Compared with the prior art, in one aspect, the embodiment separates the frequency domain resources used by the group service from the frequency domain resources used by other services (i.e., the first frequency domain resource and the non-first frequency domain resource), so that the group service can be scheduled on a dedicated frequency domain resource, thus avoiding same frequency interference between the group service and other services; in another aspect, the frequency domain resources available for the group service are grouped in the embodiment, and one of different group services may be selected to implement the service. Since the frequency domain resources of different frequency domain resource groups are different, the same frequency interference among multiple group services is avoided. It should be noted that while a plurality of units of the resource scheduling device have been mentioned in the detailed description above, this division is not mandatory. In fact, according to the embodiments of the present invention, the features and functions of the two or more units described above may be embodied in one device or in different devices. And, to the contrary, the features and functions of one unit described above can be further divided and embodied by multiple subunits.

In addition, although the operations of the method of the invention are described in a particular sequence in the drawings, this does not require or imply that these operations must be performed in the particular sequence or that all of the illustrated operations have to be performed in order to achieve the expected results. Additionally or alternatively, certain steps may be omitted, multiple steps may be combined into one step for execution, and/or one step may be broken down into multiple steps for execution.

Although the spirit and principle of the invention have been described with reference to several specific embodiments, it should be understood that the invention is not limited to the specific embodiments disclosed, nor does the division of various aspects mean that features in these aspects cannot be combined to get benefits, and this division is only for the convenience of expression. The invention is intended to cover various modifications and equivalent arrangements included within the spirit and scope of the appended claims.

The invention claimed is:

1. A resource scheduling method for same frequency networking in an LTE cluster system, wherein the method comprises:
    determining a first frequency domain resource in the LTE cluster system, wherein the first frequency domain resource is an accessible frequency domain resource to a group service and belongs to a frequency domain resource of the cluster system;
    dividing the first frequency domain resource into at least two frequency domain resource groups;
    selecting one frequency domain resource group from the at least two frequency domain resource groups to perform the group service when a newly-built group service exists, so as to implement same frequency networking resource scheduling; and
    determining a second frequency domain resource in the LTE cluster system, wherein the second frequency domain resource is an accessible frequency band resource to a single call service and belongs to a frequency domain resource of the cluster system excluding the first frequency domain resource;
    wherein:
    when the single call services in the LTE cluster system are more than the group services, then the second frequency domain resources in the LTE cluster system determined are more than the first frequency domain resources; and
    when the group services in the LTE cluster system are more than the single call services, then the first frequency domain resources in the LTE cluster system determined are more than the second frequency domain resources.

2. The resource scheduling method according to claim 1, wherein the dividing the first frequency domain resource into at least two frequency domain resource groups specifically comprises:
    dividing the first frequency domain resource into frequency domain resource groups with a number adaptive to the quantity of the group service according to the quantity of the group service, and dividing the first frequency domain resource into frequency domain resource groups with a size adaptive to a service type according to the service type.

3. The resource scheduling method according to claim 1, wherein the selecting one frequency domain resource group from the at least two frequency domain resource groups to perform the group service when a newly-built group service exists, so as to implement same frequency networking resource scheduling specifically comprises:
    when the newly-built group service exists, judging whether there exist unoccupied frequency domain resource groups, and if the unoccupied frequency domain resource groups exist, selecting one frequency domain resource group from the unoccupied frequency domain resource groups to perform the group service, so as to implement same frequency networking resource scheduling.

4. The resource scheduling method according to claim 3, wherein if all the frequency domain resource groups are occupied, the frequency domain resource group with minimum interference is selected to perform the group service.

5. The resource scheduling method according to claim 4, wherein the selecting the frequency domain resource group with minimum interference to perform the group service specifically comprises:
    acquiring a transmission power of the frequency domain resource group occupied; and
    selecting the frequency domain resource group with a transmission power lower than a preset threshold to perform the group service.

6. The resource scheduling method according to claim 1, wherein the method further comprises:
    dividing the second frequency domain resource into at least two continuous frequency domain regions; and
    selecting one continuous frequency domain region from the at least two continuous frequency domain regions as a primary frequency region to perform the single call service when a newly-built single call service exists.

7. The resource scheduling method according to claim 6, wherein the single call service is a newly-built single call service existing at a cell edge, and then the primary frequency region selected to perform the single call service is different from a primary frequency region selected by another single call service existing at a cell edge adjacent to the cell.

8. The resource scheduling method according to claim 6, wherein the single call service is a newly-built single call service existing at a cell center, then one continuous frequency domain region is selected from the at least two continuous frequency domain regions as the primary frequency region to perform the single call service, and at least one continuous frequency domain region excluding the primary frequency region is selected from the at least two continuous frequency domain regions as a secondary frequency region to perform the single call service, and the power transmission in the secondary frequency region is reduced.

9. A resource scheduling device for same frequency networking in an LTE cluster system, wherein the device comprises a processor configured to implement a first determination unit, a first resource group dividing unit, a first resource scheduling unit, and a second determination unit, wherein:
    the first determination unit is configured to determine a first frequency domain resource in the LTE cluster system, wherein the first frequency domain resource is an accessible frequency domain resource to a group service and belongs to a frequency domain resource of the cluster system;
    the first resource group dividing unit is configured to divide the first frequency domain resource into at least two frequency domain resource groups; and
    the first resource scheduling unit is configured to select one frequency domain resource group from the at least two frequency domain resource groups to perform the group service when a newly-built group service exists, so as to implement same frequency networking resource scheduling; and
    the second determination unit is configured to determine a second frequency domain resource in the LTE cluster system, wherein the second frequency domain resource is an accessible frequency band resource to a single call service and belongs to a frequency domain resource of the cluster system excluding the first frequency domain resource;
    wherein:
    when the single call services in the LTE cluster system are more than the group services, then the second frequency domain resources in the LTE cluster system determined are more than the first frequency domain resources; and when the group services in the LTE cluster system are more than the single call services, then the first frequency domain resources in the LTE cluster system determined are more than the second frequency domain resources.

10. The resource scheduling device according to claim 9, wherein the first resource group dividing unit comprises a resource group number dividing subunit and a resource group size dividing subunit, wherein:

the resource group number dividing subunit is configured to divide the first frequency domain resource into frequency domain resource groups with a number adaptive to the quantity of the group service according to the quantity of the group service, and the resource group size dividing subunit is configured to divide the first frequency domain resource into frequency domain resource groups with a size adaptive to a service type according to the service type.

11. The resource scheduling device according to claim 9, wherein the first resource scheduling unit comprises a judgment subunit and a first scheduling subunit, wherein:

the judgment subunit is configured to, when the newly-built group service exists, judge whether there exist unoccupied frequency domain resource groups exist, and if the unoccupied frequency domain resource groups exist, trigger the first scheduling subunit; and the first scheduling subunit is configured to select one frequency domain resource group from the unoccupied frequency domain resource groups to perform the group service, so as to implement same frequency networking resource scheduling.

12. The resource scheduling device according to claim 11, wherein the first resource scheduling unit comprises a second scheduling subunit configured to select the frequency domain resource group with minimum interference to perform the group service when all the frequency domain resource groups are occupied.

13. The resource scheduling device according to claim 12, wherein the second scheduling subunit comprises a power acquisition subunit and a resource group selection subunit, wherein:

the power acquisition subunit is configured to acquire a transmission power of the frequency domain resource group occupied; and the resources group selection subunit is configured to select the frequency domain resource group with a transmission power lower than a preset threshold to perform the group service.

14. The resource scheduling device according to claim 9, wherein the processor is further configured to implement a second resource dividing unit and a second resource scheduling unit, wherein:

the second resource group dividing unit is configured to divide the second frequency domain resource into at least two continuous frequency domain regions; and the second resource scheduling unit is configured to select one continuous frequency domain region from the at least two continuous frequency domain regions as a primary frequency region to perform the single call service when a newly-built single call service exists.

15. The resource scheduling device according to claim 14, wherein the single call service is the newly-built single call service existing at a cell edge, and then the primary frequency region selected to perform the single call service is different from a primary frequency region selected by another single call service existing at a cell edge adjacent to the cell.

16. The resource scheduling device according to claim 14, wherein the single call service is a newly-built single call service existing at a cell center, then one continuous frequency domain region is selected from the at least two continuous frequency domain regions as the primary frequency region to perform the single call service, and at least one continuous frequency domain region excluding the primary frequency region is selected from the at least two continuous frequency domain regions as a secondary frequency region to perform the single call service, and the power transmission in the secondary frequency region is reduced.

17. The resource scheduling device according to claim 14, wherein the device is applied to cells that are geographically adjacent.

18. An EnodeB, wherein the EnodeB comprises a processor, and the processor is configured to determine a first frequency domain resource in an LTE cluster system, wherein the first frequency domain resource is an accessible frequency domain resource available for a group service and belongs to a frequency domain resource of the cluster system; divide the first frequency domain resource into at least two frequency domain resource groups; select one frequency domain resource group from the at least two frequency domain resource groups to perform the group service when a newly-built group service exists, so as to implement same frequency networking resource scheduling; determine a second frequency domain resource in the LTE cluster system, wherein the second frequency domain resource is an accessible frequency band resource to a single call service and belongs to a frequency domain resource of the cluster system excluding the first frequency domain resource; wherein when the single call services in the LTE cluster system are more than the group services, then the second frequency domain resources in the LTE cluster system determined are more than the first frequency domain resources and when the group services in the LTE cluster system are more than the single call services, then the first frequency domain resources in the LTE cluster system determined are more than the second frequency domain resources.

19. The EnodeB according to claim 18, wherein dividing the first frequency domain resource into at least two frequency domain resource groups specifically comprises dividing the first frequency domain resource into frequency domain resource groups with a number adaptive to the quantity of the group service according to the quantity of the group service, and dividing the first frequency domain resource into frequency domain resource groups with a size adaptive to a service type according to the service type.

20. The EnodeB according to claim 18, wherein the processor is further configured to:

divide the second frequency domain resource into at least two continuous frequency domain regions; and select one continuous frequency domain region from the at least two continuous frequency domain regions as a primary frequency region to perform the single call service when a newly-built single call service exists.

* * * * *